July 3, 1951 R. A. FISCH 2,559,353

MOUNTING AND PROTECTING DEVICE FOR CATHODE-RAY TUBES

Filed July 25, 1950 2 Sheets-Sheet 1

INVENTOR.
RICHARD A. FISCH

BY

Greene & Durr
ATTORNEYS

July 3, 1951 R. A. FISCH 2,559,353

MOUNTING AND PROTECTING DEVICE FOR CATHODE-RAY TUBES

Filed July 25, 1950 2 Sheets-Sheet 2

INVENTOR.
RICHARD A. FISCH

BY

Greene & Durr
ATTORNEYS

Patented July 3, 1951

2,559,353

UNITED STATES PATENT OFFICE 2,559,353

MOUNTING AND PROTECTING DEVICE FOR CATHODE-RAY TUBES

Richard A. Fisch, Kew Gardens, N. Y.

Application July 25, 1950, Serial No. 175,677

3 Claims. (Cl. 177—316)

This invention relates to a dust proof mounting and protecting ring for a flanged type of metal backed cathode ray tube.

An object of this invention is to provide a mounting ring for a cathode ray tube which simultaneously acts as an insulating device and which is adapted to carry a mask and a flat protective glass plate.

An object of this invention is to provide a mounting ring for a cathode ray tube which simultaneously acts as an insulating device and which is adapted to carry a mask and a flat protective glass plate to carry a metalized mask.

These objects and others ancillary thereto are obtained by providing an open ring with a plurality of pairs of interior flanges, each pair of interior flanges forming an interior groove therebetween. One of the interior grooves so formed is located at one side of the ring and is continuous and adapted to receive and straddle the exterior peripheral flange adjacent the lens or screen of the television or cathode ray tube. Another continuous interior groove formed by the flanges at the opposite side of the ring is adapted to receive a protecting transparent plate. Between the two continuous grooves is a third groove which may be continuous or discontinuous and which is adapted to receive a mask for the screen. It is desirable to space the intermediate groove so that the mask does not actually touch the screen of the television tube.

The flanges which form the groove that holds the protective transparent plate are made continuous so as to form a dustproof seal between the outer atmosphere and the space between the transparent plate and the screen or lens of the television tube. These flanges may be parallel to the flanges which are adapted to straddle the flange of the television tube or the two pairs of flanges might be at a slight angle to each other so that an inserted protecting plate will slope slightly away from the plane of the lens of the television tube when the ring and protecting plate are fitted in a television set. When the outer protecting plate slopes away from the plane of the lens of the cathode ray tube of a television set, the plate tends to deflect reflected light away from the eyes of the viewer and reduce the interference of the reflected light with the televised image.

The protective transparent plate may be laminated glass, case hardened glass or transparent plastic material such as methyl methacrylate resin. One advantage to the present invention is that the sleeve with the protective glass plate and mask may be placed on the cathode ray tube before it is assembled into the television set. Although such television tubes do not explode very often, they are under a high vacuum and when they do explode glass is thrown in many directions and dangerous injuries to life and property are apt to occur. There is also a danger where there are numerous tubes about that a first explosion will start a chain reaction of similar explosions since the flying glass particles together with the flow of air which occurs when a first explosion takes place are both likely to upset the equilibrium of other adjacent tubes. Another advantage of the construction is that it makes it possible to employ a flat protecting plate.

The novel features characteristic of this invention are set forth with particularity in the appended claims. The invention itself, however, both as to its organization and its method of operation, together with additional objects and advantages thereof, will best be understood from the following description of specific embodiments when read in connection with the accompanying drawings in which:

Figure 1:
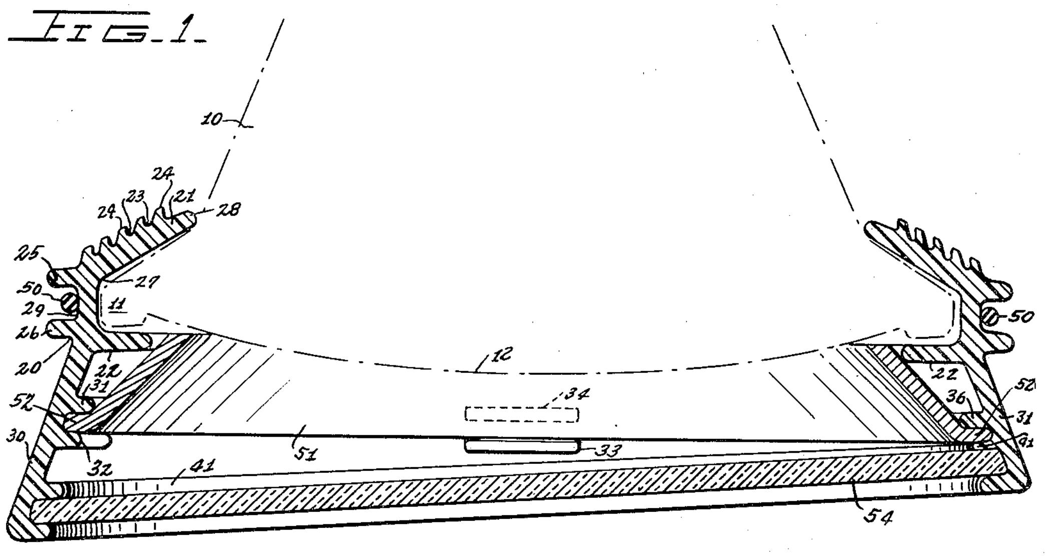
Figure 1 is a cross sectional view of a device made according to the present invention.

When metal backed television tubes (shown diagrammatically at 10 in Figure 11) the metal backing contains a flanged portion 11 at the end thereof adapted to form a seat for the lens of the tube, the lens being located at the area of the curved dot-dash line 12. Since the metal backing is under a high voltage and since the lens must be visible, some means is necessary to insulate flanged area 11 thereof to prevent persons, etc., from being shocked by coming too close to the highly charged metal backing. The ring device 20 of the present invention insulates the front area of the tube which is the only part that is exposed in a completed television set and in addition the ring has other features which will now be described in detail.

The ring 20 has two interior flanges 21, 22 that extend all the way around the ring and form the groove 27 therebetween adapted to straddle the flange 11 of the tube 10. The flange 21 is somewhat longer than the flange 22 and in addition contains the alternate ridges 24, 24 and valleys 23, 23. The valleys 23 and ridges 24 are added so as to give at least two inches of leakage path between the point where the tip of the flange 28 touches the metal backing and the tip of the external flange which may contact other parts of the set or cabinet. Opposite the internal groove 27 is the external groove 29 formed between the continuous exterior flanges 25, 26. This external groove 29 is adapted to hold the cable or cord 50 which is tightened about the groove 29 to securely hold the ring 20 with its ends (Figure 4) together upon the flange 11 of the tube 10.

The top part of the tube when it is mounted in a set would ordinarily be that part at the left hand side of Figure 1. The diverging peripheral flange 30, 31 extends outwardly from the base of the internal flange 22, the part 30 being at the top of the ring and the part 31 at the bottom thereof. About midway of the top portion 30 are the pair of internal flanges 31, 32. Also the pair of flanges 33, 34 is located at one side of the ring and a similar pair 35 (only one shows in Figure 3) is located at the opposite side. These flanges are adapted to hold rim 52 of the mask 51. The mask 51 is suitably formed to cut off a large part of the distortion areas of the top, bottom and sides of the tube and furnish a rectangular viewing opening 53. One advantage in incorporating the mask 51 in the insulating ring is that by this construction it is possible to include a mask which is metallized, the insulation material of the ring protecting the mask from the highly charged tube elements. In the construction shown in Figure 1, the lower part of the mask 51 is supported between flange 36 and the narrow flange 41 which served to separate the rim 52 of the mask 51 from the lower edge of the protecting plate 54.

This protecting plate 54 is held in tilted position with respect to the lens 12 of the cathode ray tube by the pair of internal flanges 41, 42 which are continuous with respect to the ring. These flanges 41, 42 are substantially equally spaced relative to each other but instead of being equally spaced from the flange 22 gradually approach the flange 22 from the top 30 of the ring to the bottom 31 thereof. Therefore, the transparent plate 54 tilts downwardly with respect to the plane of the lens 12 when the ring assembly is fixed on a cathode ray tube. The interior flanges 41, 42 are made continuous in order to furnish an air tight space between the flange 11 of the television tube and the transparent plate 54. Since the lens 12 of the tube tends to collect an electric charge, dust particles from the air tend to precipitate upon the surface thereof. This destroys the visibility of the image causing the lens 12 to appear cloudy or dark. By making the area between the lens 12 and the transparent plate 54 dust-proof, the continuous accumulation of dust on the lens 12 is prevented. It is very desirable therefore that the internal flanges 21, 22, 41 and 42 be continuous.

Figures 2, 3:
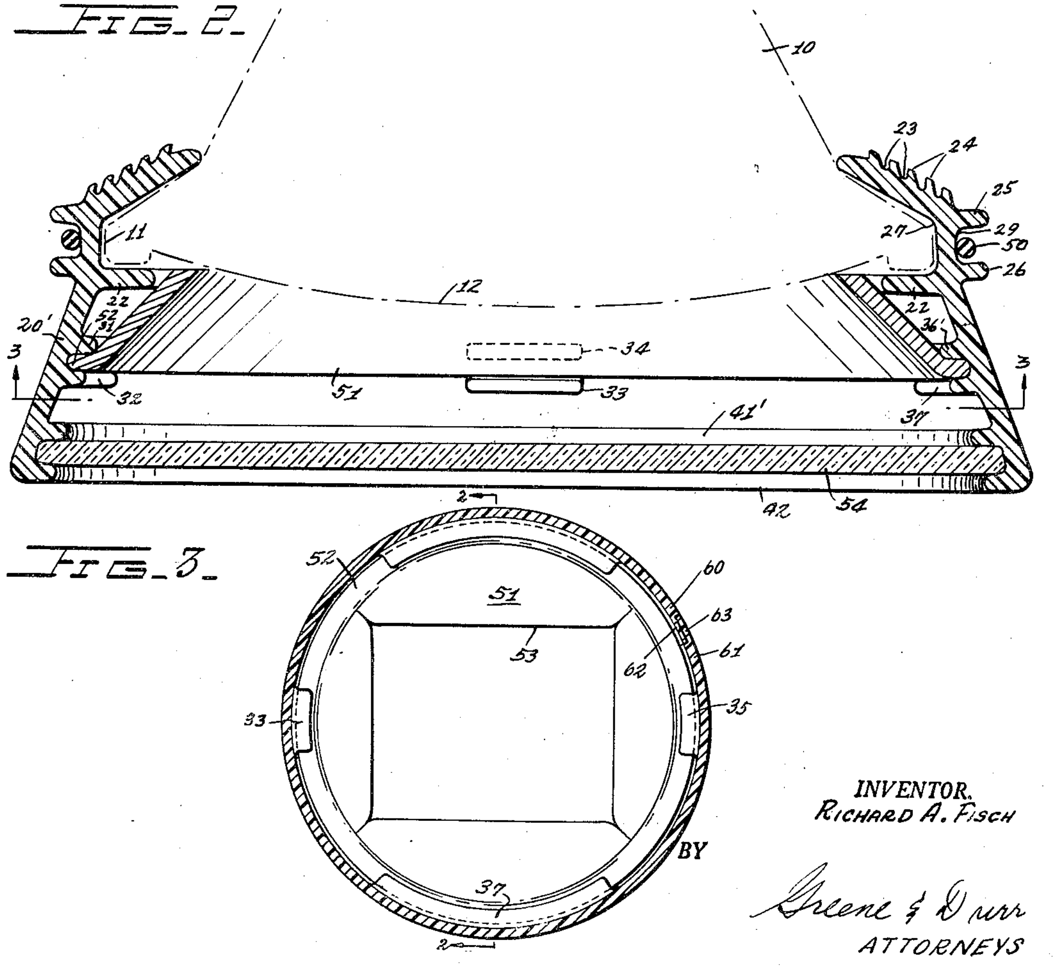
Figure 2 is a view similar to Figure 1 of a modified form of the device and taken on line 2—2 of Figure 3.
Figure 3 is a front cross sectional view of the device taken on line 3—3 of Figure 2.

Figure 2 shows a modified form of ring 20' which is similar to that of Figure 1 except that in Figure 2 the ring has substantially the same cross sectional shape throughout its circumference. Like numbers refer to like parts in all the figures. In Figure 2 the flanges 36', 37 are the substantal mirror images of the corresponding top flanges 31, 32 and, the flange 41' which is to hold the inside edge of the transparent plate 54 is of uniform thickness and is uniformly spaced from the flange 22.

Figure 4:
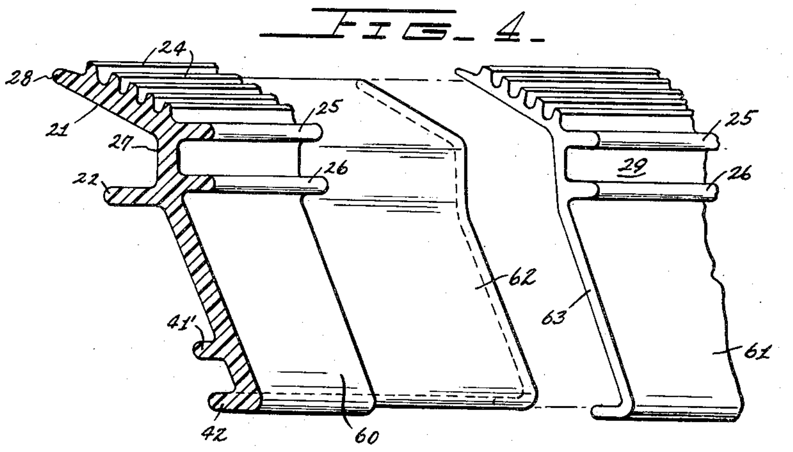
Figure 4 is a detail view showing how the ends of the ring are fitted together.

As shown in Figures 3 and 4 the ring 20 or 20' is an open one (prior to being placed on the cathode ray tube) but at the gap or opening thereof the opposed ends 60, 61 have interfitting parts 62, 63 so that the effect of a solid ring is obtained. The part 63 has a cut-away portion on the inside thereof adapted to receive the narrow tongue portion 62. The protruding portions extending toward the outside of the ring such as the ridges 24 and flanges 25, 26 are removed from tongue and the interfering protruding portions extending toward the inside of the part 61 such as the flanges 22 and 41 are removed therefrom so that a smooth, almost unperceptible union is obtained.

Figure 5:
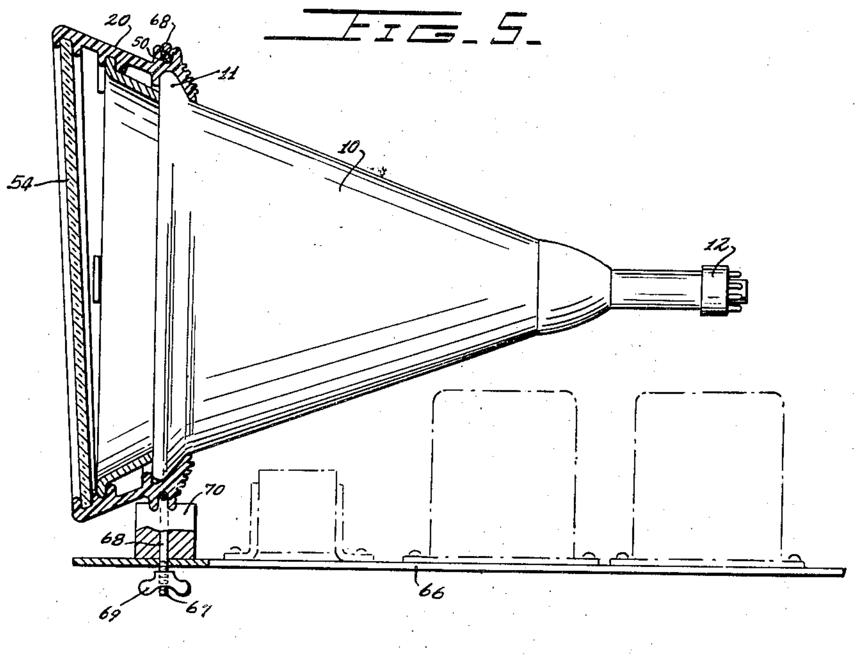
Figure 5 is a view illustrating how the ring of Figure 1 secures the cathode ray tube to a television set.

Figure 5 illustrates how the ring of the present invention aids in mounting the tube to the chassis of a television set. As indicated above the ring 20 together with the protecting plate 54 may be placed upon the tube 10 at an early stage of the assembling process so that the other tubes and the workers are protected from any accidental explosion. The cable 50 securely holds the ring 20 and protecting plate 54 in place. The protected tube 10 can then be fixed on the chassis 66 of the set at any desirable time. For example, one or more supporting blocks 70 may be provided on the chassis to receive the lower edge of the ring 20 and properly adjust the height of the tube with respect to the chassis. A cable 68 having one or both of its ends threaded as shown at 67 may then be passed around the upper part of the exterior groove 29 and then secured and tightened upon the chassis by the nuts 69 securely hold the tube in the position desired. Although the base 12 of the tube 10 is also held by inserting it in a suitable socket secured to the chassis 66, this may be done subsequently if desired. Although the device has been described in connection with a cathode ray tube with a round lens it will be understood that it can also be designed to fit tubes with lenses of other shapes, for example, tubes with elliptical or rectangular lenses.

It will be readily understood therefore that the present invention provides a novel mounting and protecting ring which serves to provide a secure way of mounting a metal-backed television tube together with a protecting plate to a chassis of a television set without requiring any help from the cabinet of the set for either mounting, protecting or insulating the front or lens area of the tube. The invention also provides a device for protecting people from the effects of an exploding tube that can be employed continuously from the time preceding the assembly of the tube into a set.

I claim:

1. A mounting and protecting device for a metal-backed cathode ray tube of the type having an exterior peripheral flange adjacent the lens thereof, said device comprising a unitary tubular clamping member formed substantially entirely of insulating flexible material and having the general configuration of the said peripheral flange of the cathode ray tube but having a gap forming two interfitting ends at one portion thereof, a pair of exterior peripheral flanges forming a groove therebetween adjacent one end of said tube adapted to receive a tightening strand to hold the gapped clamping member on the flange of the cathode ray tube, a first pair of interior peripheral flanges forming a first interior groove therebetween adapted to straddle the peripheral flange of the cathode ray tube, said first interior groove being opposite the said exterior groove, a second pair of interior flanges at the opposite end of said clamping member, said second pair of interior flanges forming a groove therebetween adapted to receive the edges of a transparent protective plate, a transparent protecting plate in the groove formed by said second pair of flanges, said first and second pairs of interior flanges being substantially continuous when the gap in said member is held in closed position by the tightening strand, the plane of the groove formed by said second pair of interior flanges being tilted with respect to the plane of the groove formed by said first pair of interior flanges.

2. A mounting and protecting device for a metal-backed cathode ray tube of the type having an exterior peripheral flange adjacent the lens thereof, said device comprising a unitary tubular clamping member formed substantially entirely of insulating flexible material and having the general configuration of the said peripheral flange of the cathode ray tube but having a gap forming two interfitting ends at one portion thereof, a pair of exterior peripheral flanges forming a groove therebetween adjacent one end of said tube adapted to receive a tightening strand to hold the gapped clamping member on the flange of the cathode ray tube, a first pair of interior peripheral flanges forming a first interior groove therebetween adapted to straddle the peripheral flange of the cathode ray tube, said first interior groove being opposite the said exterior groove, a second pair of interior flanges at the opposite end of said clamping member, said second pair of interior flanges forming a groove therebetween adapted to receive the edges of a transparent protective plate, a transparent protecting plate in the groove formed by said second pair of flanges, said first and second pairs of interior flanges being substantially continuous when the gap in said member is held in closed position by the tightening strand, a set of interior flanges between the first and the second pairs of flanges, said set of intermediate flanges being adapted to hold a masking plate in spaced relation to the lens of the cathode ray tube when the clamping member is in place on the cathode ray tube, a masking plate in the last named set of interior flanges, the interfitting ends of the clamping member, and the first and second pairs of interior flanges cooperating with the cathode ray tube and the protecting transparent plate to provide a dust-proof area between the lens end of the cathode ray tube and the transparent protecting plate.

3. The device of claim 2 in which the plane of the second groove which holds the transparent protective plate is tilted with respect to the plane of the first groove which is adapted to straddle the flange of the cathode ray tube.

RICHARD A. FISCH.

REFERENCES CITED

The following references are of record in the file of this patent:

UNITED STATES PATENTS

| Number | Name | Date |
|---|---|---|
| 2,047,020 | Flaherty | July 7, 1936 |
| 2,388,203 | Zindel, Jr. | Oct. 30, 1945 |
| 2,429,420 | McMaster | Oct. 21, 1947 |
| 2,458,368 | Kamin et al. | Jan. 4, 1949 |
| 2,497,660 | Devine | Feb. 14, 1950 |
| 2,503,813 | Fisch | Apr. 11, 1950 |
| 2,505,736 | Herscher et al. | Apr. 25, 1950 |

FOREIGN PATENTS

| Number | Country | Date |
|---|---|---|
| 520,412 | Great Britain | Apr. 23, 1940 |
| 600,096 | Great Britain | Mar. 31, 1948 |